United States Patent [19]

Giraud

[11] 4,224,666
[45] Sep. 23, 1980

[54] DATA PROCESSING SYSTEM WHICH PROTECTS THE SECRECY OF CONFIDENTIAL DATA

[75] Inventor: Georges J. L. Giraud, Le Vesinet, France

[73] Assignee: Compagnie Internationale pour l'Informatique Cii-Honeywell Bull, Paris, France

[21] Appl. No.: 900,503

[22] Filed: Apr. 27, 1978

[30] Foreign Application Priority Data

Apr. 27, 1977 [FR] France ................. 77 12781

[51] Int. Cl.$^2$ ............................................. G06F 3/00
[52] U.S. Cl. ............................ 364/200; 235/380; 235/487
[58] Field of Search .......... 235/379, 380, 382, 487; 340/149 A; 364/200 MS File, 900 MS File

[56] References Cited

U.S. PATENT DOCUMENTS

| | | | |
|---|---|---|---|
| 3,544,769 | 12/1970 | Hedin | 235/379 |
| 3,806,882 | 4/1974 | Clarke | 364/900 |
| 4,001,550 | 1/1977 | Schatz | 235/379 |
| 4,016,405 | 4/1977 | McCune et al. | 235/380 |
| 4,138,057 | 2/1979 | Atalla | 235/487 |

*Primary Examiner*—Leo H. Boudreau

*Attorney, Agent, or Firm*—Kerkam, Stowell, Kondracki & Clarke

[57] ABSTRACT

A data processing system is provided which protects the secrecy of confidential data transmitted between a transmitting terminal and key, such as a credit card, which is used to authorize a dialogue between a data processing machine and an operator. A light pen is provided which is personal to each operator and which includes means for formulating the confidential data in a predetermined code and transmitting the coded information by means of an information carrying light wave. The light pen includes a keyboard which may be in the form of cursors movable along a longitudinal graduated scale which sets the coded data in accordance with the position of the cursors. To this end, the light pen houses an encoder, the output of which is fed to a shift register. The output of the shift register is modulated and fed to an optical-electrical transducer system which is screened to prevent unauthorized detection. The credit card receives the coded information through its own electrical transducer. The information is demodulated, and fed to a register, the output of which is compared to information stored in a memory contained in an integrated circuit chip which forms part of the card. A control responsive to the output of the comparator authorizes the dialogue to take place.

18 Claims, 9 Drawing Figures

DATA PROCESSING SYSTEM WHICH PROTECTS THE SECRECY OF CONFIDENTIAL DATA

BACKGROUND OF THE INVENTION

1. Field of the Invention

The present invention relates to a data processing system which protects the secrecy of confidential data.

2. Description of the Prior Art

Any data processing system includes a data processing machine connected to an apparatus for transmitting data to the machine. Of these systems, some are intended to process information made up of both data of a routine nature and confidential data. In such systems the confidential data is generally used to authorize the dialogue between the machine and the operator via the said data transmitting apparatus. There are a number of specific cases which are typical of systems of this nature, and these will be described briefly herein by way of example.

The first case is that in which the data processing machine includes a member intended to process a predetermined confidential item of data generally referred to as a key. To prevent any illicit use the key is changed regularly. In such a system, the operator first has to transmit an item of confidential data corresponding to the key, via the data transmitting device of the machine, to the member which holds the key. In this member a comparison is made between the confidential item of data received and the key, and if they are the same the member authorizes a dialogue between the machine and the operator for data of any kind, be it confidential or otherwise. However, to avoid any misunderstanding in the remainder of the description, what is termed confidential data will be the data which is used as a key to open the dialogue between the machine and the operator. Also, the said member which holds the key will be referred to below as the auxilliary member, in particular because of its function in the system and its interchangeable nature.

The second example of a known system relates to systems which employ credit cards. In cases where the credit cards contains only the personal key of the card holder, these systems are similar to those of the previous example, and the auxiliary member is formed by each of the various credit cards. It is known, however, that the trend is towards introducing an integrated circuit device into cards for crediting and/or debiting. In such systems, the auxiliary member thus no longer processes simply the confidential data, but also certain of the items of data passing between the machine and the operator.

In all these systems, it may be noted that the keyboard available to the operator is used to transmit both confidential data intended for the auxiliary member and also data intended for the machine after the auxiliary member has authorized a dialogue. The keyboard is thus a public device at the disposal of a large number of people, but can only be used to good effect after the correct key has been transmitted. Thus, it is possible for an unauthorized user to use either the keyboard or the space which separates the keyboard from the auxiliary member to discover the key which an operator will subsequently transmit to the auxiliary member.

In the case of the first example, assuming the key has been discovered, it will then be possible for the unauthorized user to gain direct access to the machine. In the case of the second example the unauthorized user will have to steal a card from an operator who meets his requirements. With the introduction of cards incorporating integrated circuit devices, particularly in the case of credits and debits performed at a remote banking terminal or at the cash-desks of shops, theft or cards containing a key is expected to become a greater problem.

In all the systems which have just been described, the secrecy of the confidential data has so far been protected at the auxiliary member. In the systems of the first example the key is changed regularly and in the systems of the second example either a limited number of attempts is allowed for transmitting the confidential data or else the card or the integrated circuit device embodies means to prevent anybody from discovering the key. However, the unauthorized user still has the opportunity of working via keyboard or via the space which separates the keyboard from the machine.

A primary object of the present invention is to protect the secrecy of confidential data in data processing systems.

SUMMARY OF THE INVENTION

A data processing system according to the present invention is of the kind which comprises a data processing machine provided with a device for transmitting data, including confidential data, and a first member auxiliary to the machine which is intended to receive and process at least the said confidential data. The transmitting device includes a plurality of second auxiliary members which are separate from the machine, and which each include means for transmitting at least the said confidential data to the first auxiliary member by means of an information-carrying wave which is guided between the auxiliary members in a zone outside which the wave cannot be detected.

Consequently, the principle of the invention lies either in separating the functions of the transmitting devices, the infeed of the confidential code being performed by means of an auxiliary member which is given to every person who may have access to the processing system while the other functions are still performed by a public transmitting device, or else in producing the complete public transmitting device in the form of an auxiliary member which is given to every person who wishes to have access to the processing system and transmitting the confidential data in a discreet manner.

In summary, the invention provides the operator with a personal member for transmitting his confidential code, ensures that he is at all times in control of the transmission path, and allows him discreet transmission. Consequently, by combining the advantages of the invention with those of the prior art, which consisted in making the auxiliary member a member capable of preserving the secrecy of the confidential data which is contained and of confidentially processing external data with its confidential data, the invention now leaves the criminal with no means of discovering the confidential code recorded in the auxiliary member and of taking the place of the person concerned to gain access to the data processing machine.

BRIEF DESCRIPTION OF THE DRAWINGS

The features and advantages of the invention will be more clearly apparent from the following description, which is given with reference to the accompanying drawings. In the drawings:

FIG. 8 is a schematic view of part of the electronic circuit of a modified embodiment of an auxiliary member according to the invention.

DESCRIPTION OF THE PREFERRED EMBODIMENTS

Figure 1:
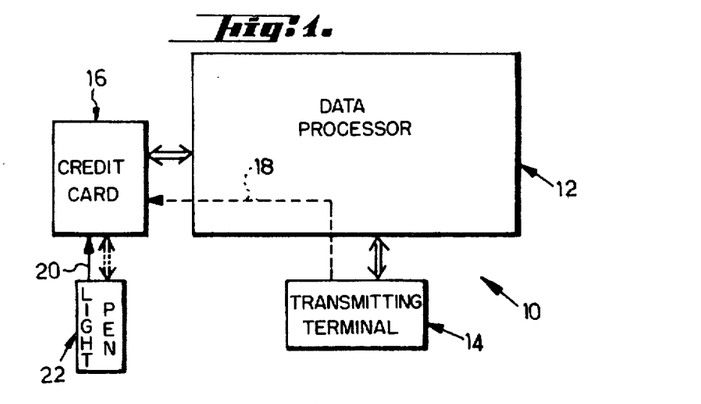
FIG. 1 is a general block diagram illustration of a data processing system which is intended to allow the object of the invention to be defined.

FIG. 1 illustrates the principle of the invention. In this figure, the data processing system 10 comprises a data processing machine 12 provided with a terminal device 14 for transmitting data which includes confidential data. The system includes a first member 16 auxiliary to the machine 12 which is intended to receive the said confidential data from the device 14 along a path 18 and to process this confidential data. As stated above, the processing of the confidential data in the auxiliary member 16 authorizes or does not authorize a dialogue which may take place, generally speaking, between the machine 12, the device 14 and the auxiliary member 16 in the case of routine data, as shown by the two-headed arrows in FIG. 1.

The system 10 which has just been described represents a prior art system. In this system the path 18, which includes the transmitting terminal 14, is at the disposal of anyone who is able to have access to the system 10 and may provide such a person with the opportunity of inserting electronic bugging means into it to discover the code which validates the operation of the machine 12.

The principle of the invention is to dispense with the public function of the path 18 by replacing it with a direct connection 20 to the first auxiliary member 16 which is established from a second, personal auxiliary member 22 which is separate frm the machine 12 and which is held by the person who wishes to communicate with the machine. In other words, there will be as many separate members 22 as there are persons authorized to have access to the system 10, each of them substituting for at least that part of device 14 which was used previously to feed in the confidential data. This does not, however, exclude the arrangement wherein each member 22 replaces the whole of the device 14 (which eventuality is represented by the two-headed arrow shown in broken lines in FIG. 1), but in general the public device 14 is retained for functions other than the feeding of confidential data to the auxiliary member 16, while the member 22 is designed only to transmit confidential data via the connection 20.

Figure 2:
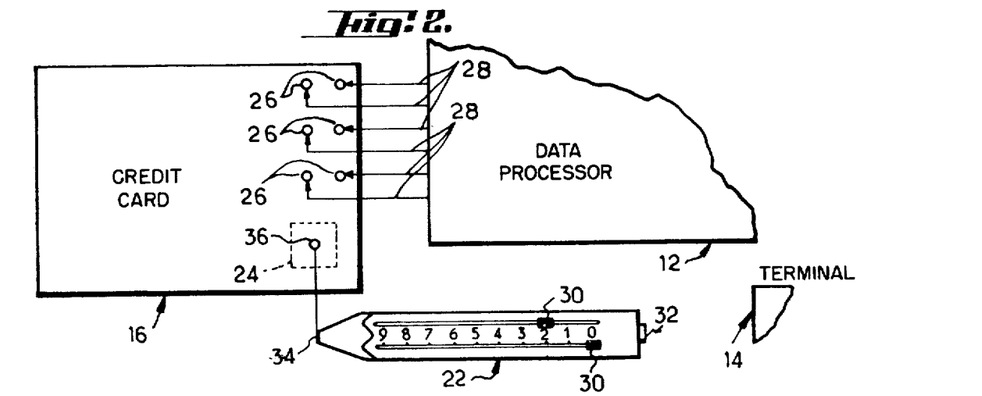
FIG. 2 is a fragmentary schematic view of part of an embodiment of the data processing system of the present invention as shown in FIG. 1.

The embodiment of a system according to the invention which is shown in FIG. 2 will bring out the features and advantages of the system. In this illustrative example, the auxiliary member 16 is a card which is personal (a credit and/or debit card, for example), like the separate auxiliary member 22 which in the present case is in the form of a light pen. Only fragmentary parts of the machine 12 and the terminal 14 are shown.

The card 16 contains an electronic integrated circuit device 24 of the kind generally referred to as an integrated circuit chip. Chip 24 contains a memory for storing a predetermined item of confidential data and a circuit for processing this item of confidential data which is intended to authorize or deny access to the machine 12. The integrated circuit chip 24 may also include means for cooperating in the operation of the machine 12 and for collecting results from it, such as, for example, updating the balance of the holder of the card which is stored in the chip memory. For this purpose, the card has contacts 26 which are connected to the integrated circuit chip 24 by conventional electrical connections which are not shown. The machine 12 on the other hand is provided with connecting pins 28 adapted to make contact with respective ones of the contacts 26 on the card 16 when properly inserted in a card receiving receptacle (not shown).

The member 22, in an illustrative example of the invention, is a light pen which includes a keyboard for formulating the confidential code. This keyboard is formed in the present instance by cursors 30 which are movable longitudinally along a numerically graduated scale and by a button 32 which is intended to validate and transmit the code which has been formulated by means of the cursors. Advantageously, the cursors are able to be reset by validating button so that they can be returned automatically to a neutral position to cancel out the code which has been formulated as soon as it has been transmitted.

The light pen 22 incorporates as electronic circuit, to be described in greater detail below, which processes the data set up by the cursors. This data is validated by the button 32 so that it can be transmitted to the point 34 of the pen in the form of a modulated light-beam which is suitably screened to prevent it from being detected. The card 16 includes coupling means 36, which are formed in the illustrative example of the invention by a transparent window. As illustrated, the window 36 is preferably closely associated with the chip 24 and cooperates with the point 34 of the pen 22 to receive from it the modulated light beam and to transmit this beam to the circuit of chip 24, so that the beam may be converted into a corresponding electrical signal. This electrical singal is processed with the predetermined confidential data contained in the chip.

The following features are thus characteristic of the preferred embodiment of the invention: The path 20 in FIG. 1 is established by the operator by means of an instrument 22 which belongs or is personal to him (and possibly by means of a member 16 which is also personal to him) and the prior art path 18 shown in FIG. 1 is reduced to the path 20 which connects the keyboard of the pen 22 to the chip 24 via window 36, thus ensuring that the path 20 according to the invention is at all times under the control of the operator. Also, the method of transmission used for the path 20 protects the secrecy of the information which it conveys, by virtue of an information-carrying wave which is channelled through a zone outside which it cannot be detected.

It is clear that there are means other than those which have just been given as examples which would come within the above definition. As stated above, the auxiliary member 16 may be a "public" item which is associated with the machine 12, but which meets all the requisite requirements as to secrecy being, for example, a lead-coated member containing a shared confidential code (key) known only to certain persons. Also, the carrier wave used to transmit the confidential data from member 22 to member 16 may be other than light radiation, provided that it gives the requisite secrecy as defined above. Use may, for example, be made of a coaxial cable adapted to cooperate with the coupling means 36 of member 16.

Figure 3:
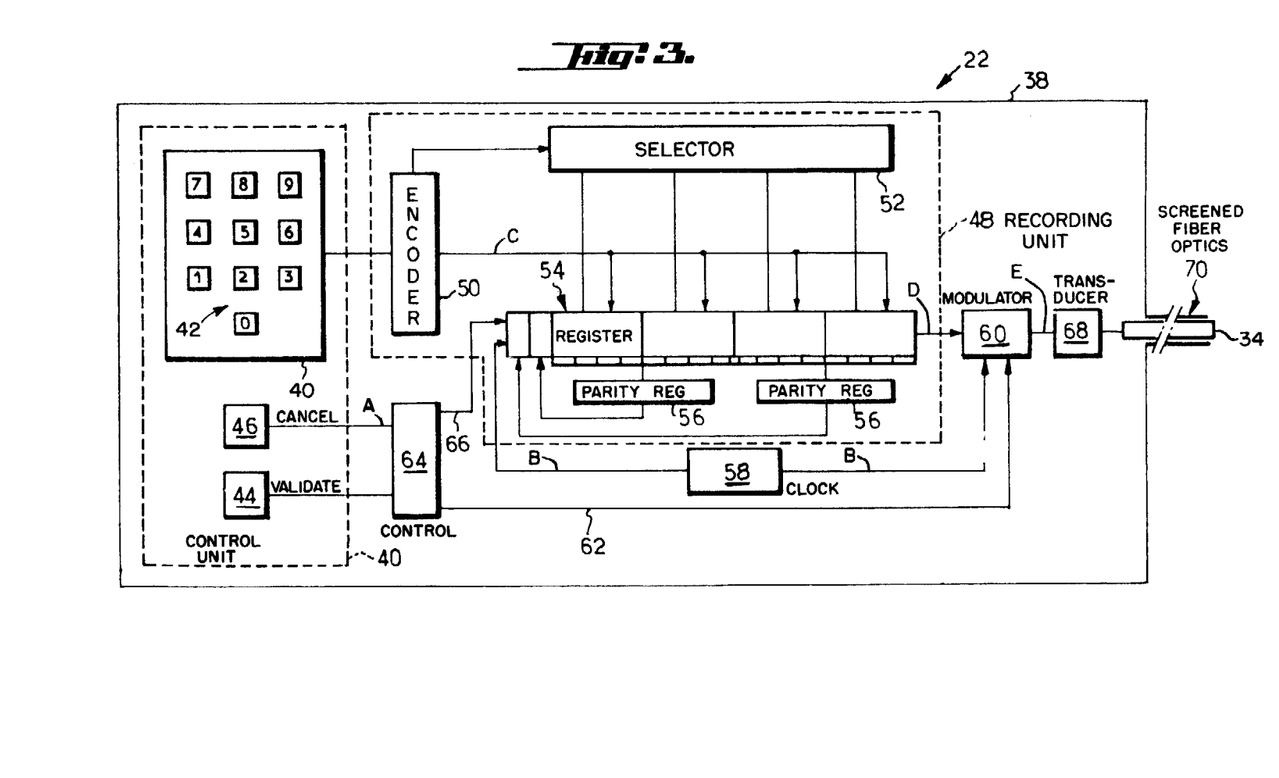
FIG. 3 is a block diagram of the electronic circuit of an embodiment of separate member according to the invention.

FIG. 3 shows, in block form, an illustrative embodiment of an electronic circuit which can be adopted for a separate member 22 according to the invention which uses light radiation as its information-carrying wave. In FIG. 3, the electronic circuit 38 includes a control unit 40 which is formed in the embodiment illustrated by a numerical keyboard 42 having ten keys which perform the same functions as the cursors 30 of the light pen in FIG. 2, and by two buttons 44 and 46, respectively for validating and cancelling out the data formulated by means of keyboard 42, button 44 being similar to button 32 of the pen 22 shown in FIG. 2. The keyboard 42 is coupled to a unit 48 for recording the data coming from keyboard 42. The recording unit 48 consists, in essence, of an encoder 50 which is connected to the keyboard 42 and whose outputs are taken to selector 52, and of a register 54 made up of shift registers which are coupled to two parity generators 56 for the more and less significant bits respectively. Unit 48 is also connected to a clock 58 for controlling in particular the register 54. The output of unit 48 corresponds to that of the last shift register in register 54 and is connected to a modulator 60. The modulator 60 is connected to clock 58 and, via a connecting lead 62, to a transmission controlling circuit 64 which is operatively connected to the validating button 44 and the cancelling button 46. The transmission controlling circuit 64 also has an output 66 connected to register 54. The output of the modulator 60 is connected to an opto-electrical transducer 68 which is intended to convert the electrical signals from the modulator 60 into light signals. The transducer 68 is coupled to a screened optical-fibre system 70 which is intended to channel the light signals produced by the transducer 68 without propagating information outside the zone defined by the system 70. The end of the optical system 70 may, for example, form the point 34 of the light pen shown in FIG. 2.

The operation of the electronic circuit 38 may be summarized as follows. It should be mentioned that a detailed explanation of the operation of an electronic circuit similar to that shown in FIG. 3 will be given at a later stage with reference to FIGS. 6 and 7. As regards the electronic circuit 38 which is illustrated in FIG. 3, it will be assumed that it is designed to transmit confidential data consisting of four figures. When the four figures are punched out on the keyboard 42, the signals from the keys of the keyboard are coded by the encoder 50, which in the present instance is a 10/4 encoder which converts the decimal information punched out on the keyboard into a four-bit data item. The four bits emitted by the encoder 50 are than channelled by the selector 52 to the appropriate areas of register 54. The four areas are loaded in sequence. At the end of loading, two parity bits are added in to the register 54.

After the four figures have been punched out on the keyboard, the operator may either press the validating button 44 to order the number which he has formulated to be transmitted, or he may press the cancelling button 46 to erase what he has formulated and allow him to punch out another member. If the operator presses the validating button 44, he gives an order to the transmission controlling circuit 64 to empty the register 54 via the connecting lead 64 to empty the register 54 via the connecting lead 66 and to modulate this data under the timing of the clock 58 via the connecting lead 62. The electrical signal leaving the modulator 60 thus consists of the four sections representing the number formulated by the operator and the two parity bits, the whole being modulated in the form of pulses which succeed one another at a frequency determined by the clock 58. This electrical signal is converted by the transducer 68 into a light signal which is picked up and guided by the optical system 70, which is formed, for example, by an optical fibre. As a simple example to illustrate a type of modulation which may be employed in the electronic circuit 38, that shown in FIG. 5 may be referred to.

Figure 5:
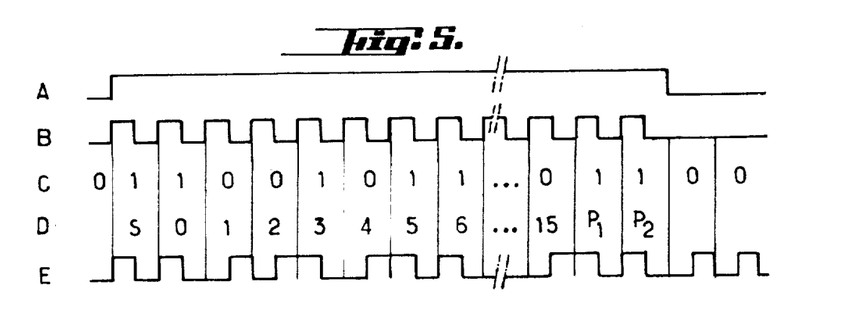
FIG. 5 shows waveforms representative of the type of modulation which may be used in accordance with the invention.

In FIG. 5, waveform A represents the transmission-validating signal generated by control circuit 64. Waveform B represents the clock signal emitted by clock 58. Line C shows an example of a message to be transmitted in the form of the values of the bits to be transmitted in each period of the clock period. Line D indicates the positions or numbers of the bits in the message, remembering that it was assumed above that the message was made up of four sections of four bits, numbered 0 to 15, and of two parity bits which are marked P1 and P2 in FIG. 5. Finally, waveform E represents the modulated signal which is modulated as a function of the value of the bits to be transmitted as shown in line C. This modulation is of a conventional kind and consists of inverting or not inverting the clock signal depending upon whether the value of the bit to be transmitted is 1 or 0. In this way, the modulated signal is representative of the clock signal of the electronic circuit 38.

Figure 4:
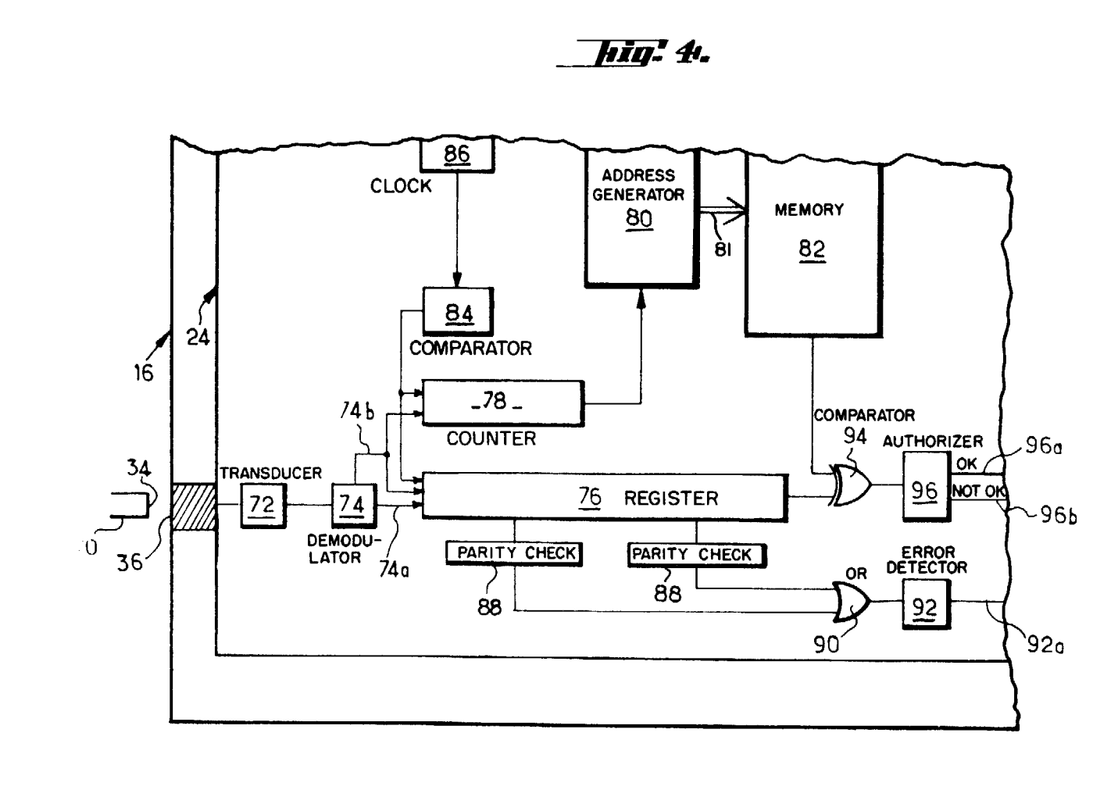
FIG. 4 is a fragmentary block diagram of the electronic circuit of an embodiment of auxiliary member according to the invention.

FIG. 4 shows an embodiment of electronic circuit which may be added, for example, to the chip 24 of the card 16 shown in FIG. 2. In FIG. 4, it is assumed, as in the case of FIG. 2, that the coupling means 36 are directly associated with the chip 24. As shown, window 36 is filled with a transparent substance which connects the outer surface of the card 16 to the surface of the chip 24. The electronic circuit shown in FIG. 4 is a logical follow-on from that shown in FIG. 3 and from the explanation of its operation which was given with reference to FIG. 5. Thus, the window 36 is coupled to an opto-electrical transducer 72 which converts the light signal from the optical fibre 70 of the separate member 22 into a corresponding electrical signal. The transducer 72 is connected to a demodulator 74, which has a first output 74a connected to a register 76 to allow the confidential data received from member 22 to be stored in this register and an output 74b representing the signals from the transmitting clock 58 is member 22 (FIG. 3). A second output 74b from demodulator 74 is also applied to register 76 and to a counter 78. This counter is coupled to register 76 and to a pulse generator 80 for generating addresses applied to memory 82 in the chip 24 via path 81. The counter 78 also receives orders from a logic comparison unit 84 which is controlled by the clock 86 of the chip 24 or by a system clock. These orders are also applied to register 76 at a third input identified by line C1.

Register 76 is on the one hand associated with two parity checkers 88 (corresponding to the parity generators 56 of the electronic circuit 38 of member 22 illustrated in FIG. 3), whose outputs are applied to an OR gate 90, the output of which controls a circuit 92 for detecting transmission errors. The circuit 92 is designed to stop the reception circuit of the chip 24 from operating to reformulate the code. Register 76 also has an output connected to a first input terminal of a comparator 94. The second input terminal of comparator 94 is connected to the memory 82 and the output of the comparator is applied to an authorizing circuit 96 which has in particular two output connections 96a and 96b over which the output control signal conveniently coupled to circuits (not shown) for controlling the chip 24 or the machine 12. The operation of the circuit which has just been described can easily be understood in the light of the explanation which has been given with reference to the transmitting circuit 38 illustrated in FIG. 3. It may be summarized as follows:

The light signals guided by the optical fibre 70 of the separate member 22 pass through the window 36 and are converted by the transducer 72 into corresponding electrical signals. The demodulator 74 reconstitutes the data in the message, which is transmitted from output 74a, and the clock signal from the transmission circuit 38, which is transmitted from output 74b. The reconstituted message is fed into register 76 under the timing of the reconstituted transmission clock-signal. The counter 78 is incremented in parallel. At the end of reception, the parity bits are compared with the parity bits calculated. If an error is found, circuit 92 develops an error control signal via its output connection 92a which switches the reception circuit of the chip 24 to the quiescent state and may also be used to order the operator to reformulate his code.

If no error is found, circuit 92 orders the start of the phase of comparing the received data with the predetermined data contained in the memory 82 of chip 24. From this moment, register 76 is read out to comparator 94 under the timing of the clock 86 of chip 24 (or of the clock signal received from the machine 12) while the predetermined data contained in memory 82 arrives at the other input of the comparator 94. The bits of the confidential data transmitted and received of which there are assumed to be sixteen, are compared with the sixteen predetermined bits contained in memory 82. If they correspond, the authorizing circuit 96 develops an output which instructs the machine 12 via connection 96a, to place itself at the disposal of the operator. If they do not correspond, the authorizing circuit 96 prevents the system 10 from operating by means of its output 96b.

Figure 6:
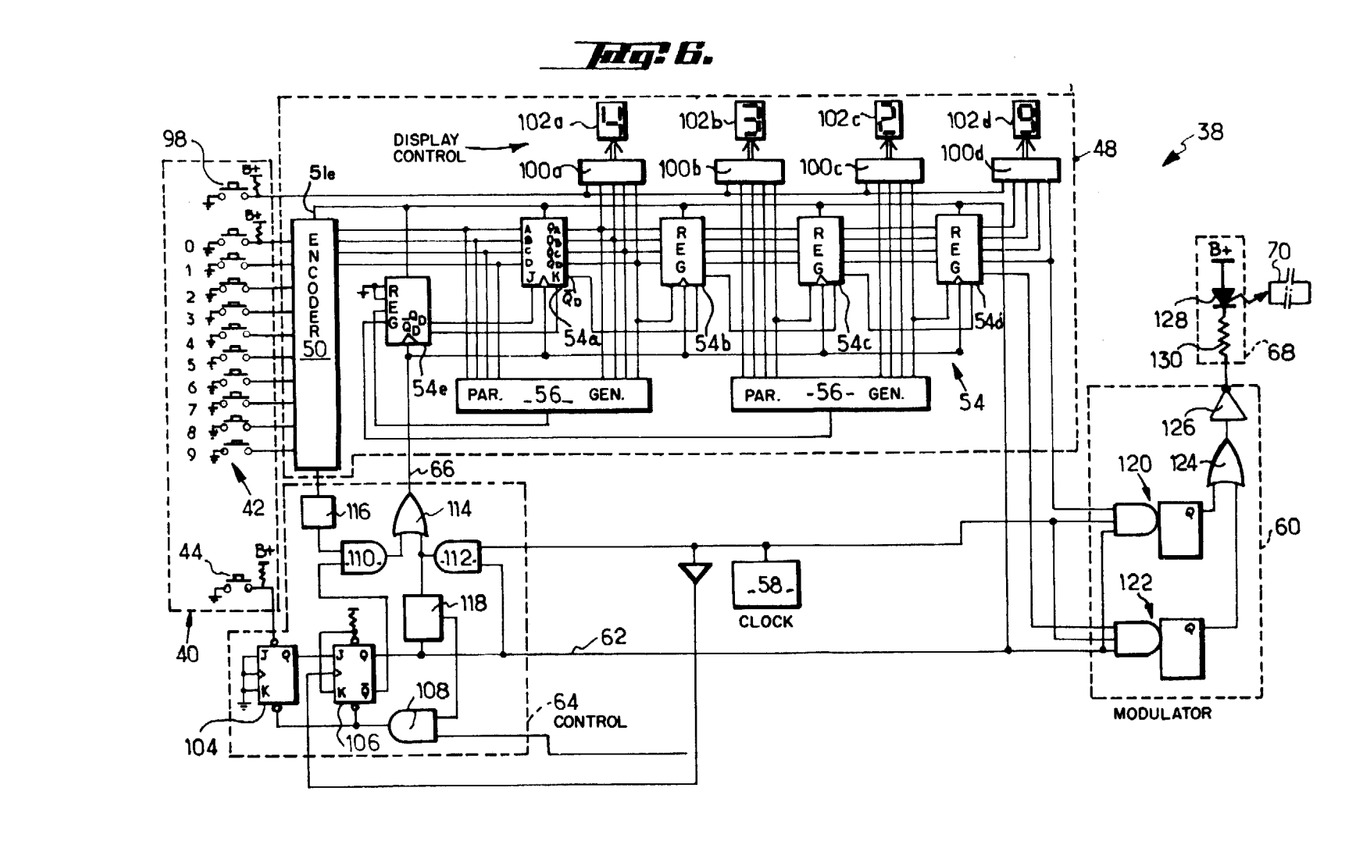
FIG. 6 is a schematic view of a modified embodiment of separate member according to the invention.
Figure 7:
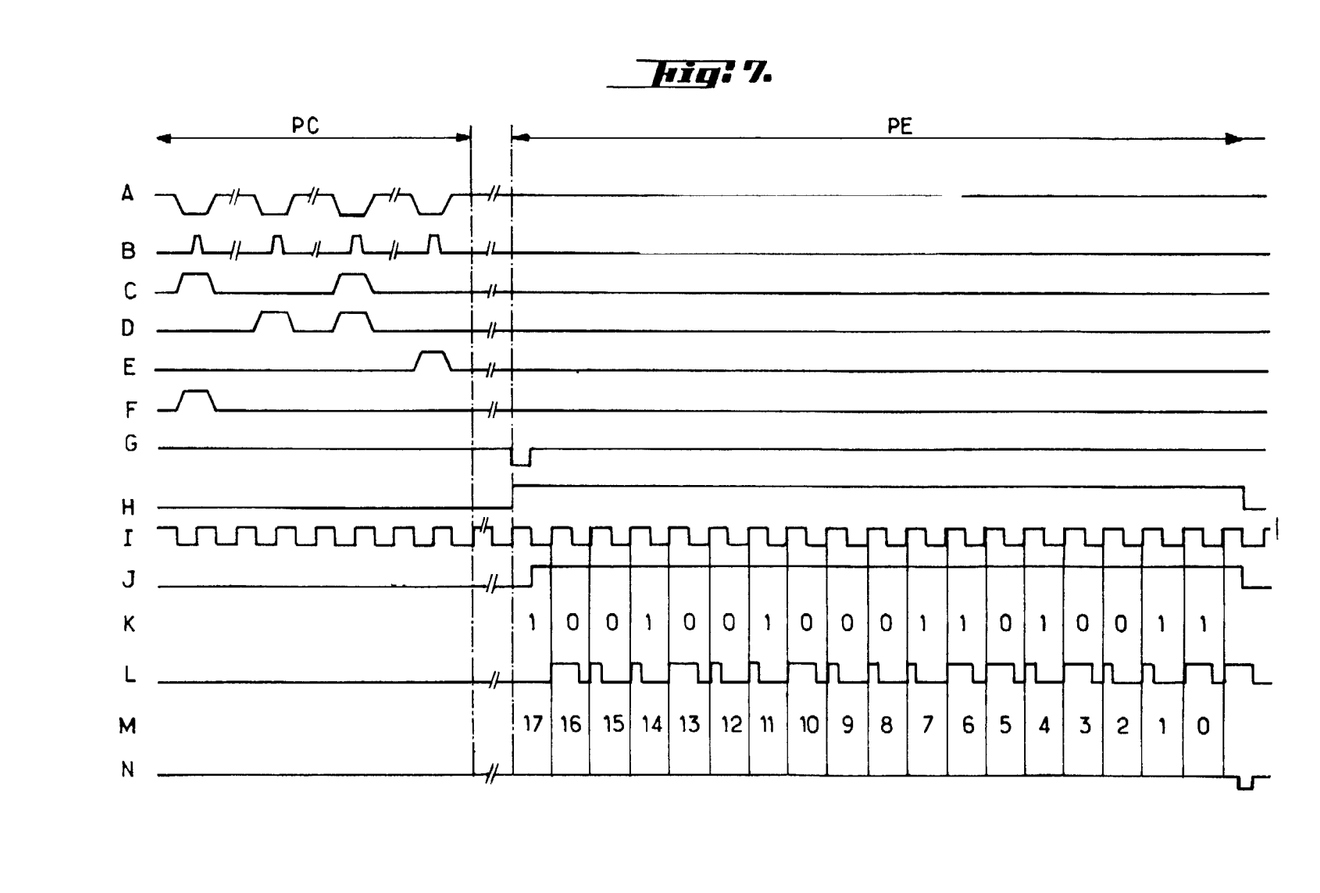
FIG. 7 shows waveforms at various points in the circuit shown in FIG. 6.
Figure 9:
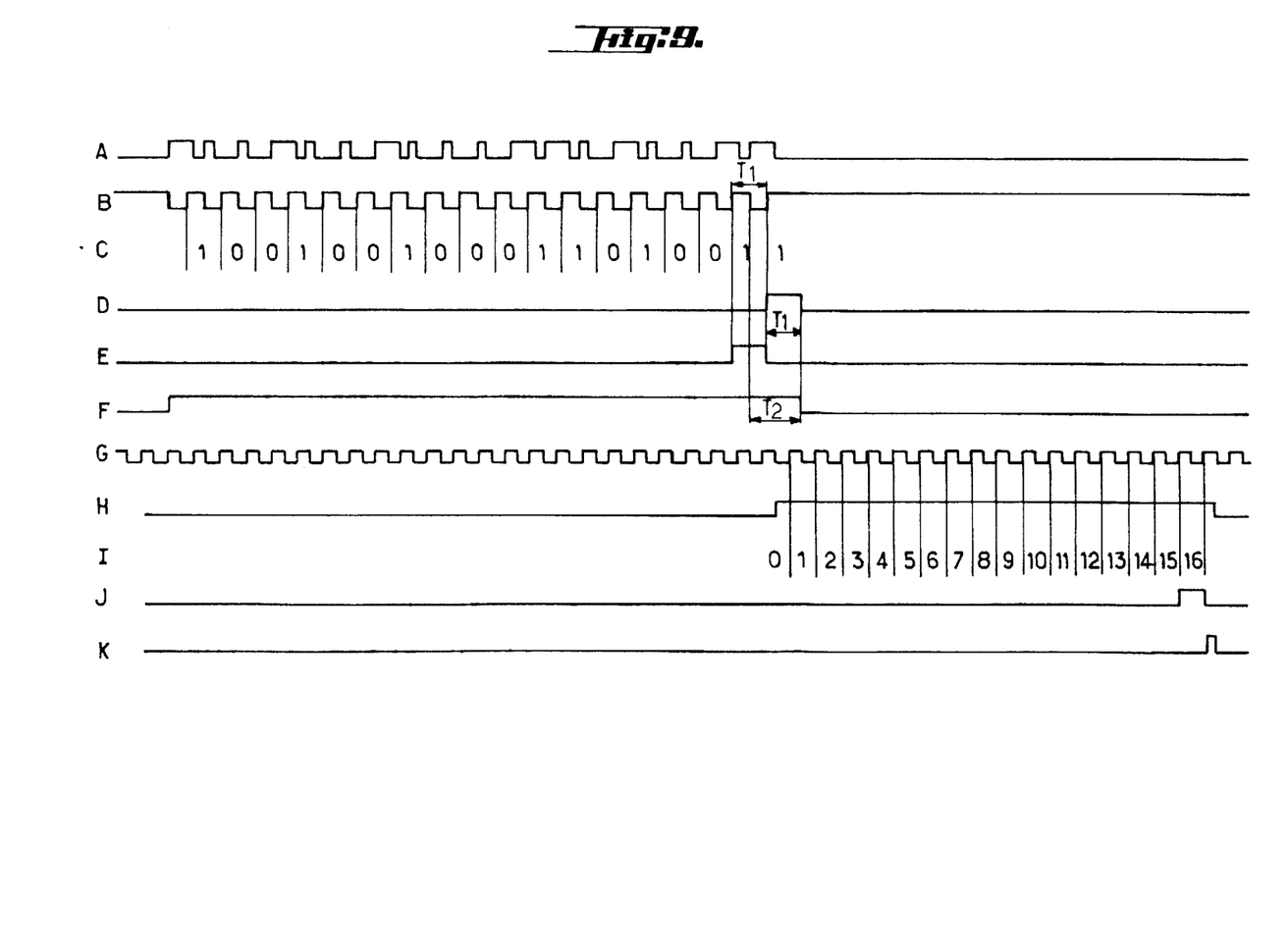
FIG. 9 shows waveforms at various points in the circuit illustrated in FIG. 8.

FIGS. 6 and 8 of the accompanying drawings show, in detailed form, modified embodiments of electric circuit which may be used for the auxiliary members 16 and 22 according to the invention. FIGS. 7 and 9 show waveforms at various points in the circuits shown in FIGS. 6 and 8, respectively, to illustrate the operation of these circuits.

FIG. 6 shows a modified embodiment of the electronic circuit 38 which may be used for a separate member 22 according to the invention. The electronic circuit 38 illustrated in FIG. 6 consists essentially of the same general components as are shown in FIG. 3. Thus, the control unit 40 with its numerical keyboard 42 having ten keys 0 to 9 and its validating button 44 is again present. The modified embodiment of circuit shown in FIG. 6 does not employ a cancelling button 46, but instead a display control button 98. Also present again are the recording unit 48 with its encoder 50, its register 54 and its two parity generators 56. In the embodiment illustrated, register 54 consists of five shift registers 54a to 54e.

The modification in comparison with the circuit 38 in FIG. 6 consists in addition of display controlling devices 100a to 100d which are associated with and correspond to respective ones of four (54a to 54d) of the five shift registers and which are operatively connected with the display button 98. The devices 100a and 100d are connected to the respective ones of display cells 102a to 102d to enable the figure formulated by the operator by means of keyboard 42 to be displayed. If it is assumed as before that the number representing the confidential code is formed by four figures, for example, 9234, the encoder 50 will obviously be of the 10/4 type, that is to say, will have four outputs, as shown. These outputs are applied to the four inputs A to D of the shift register 54a.

Each register 54 has four inputs A to D and four outputs $Q_A$ to $Q_D$ plus an output $\overline{Q}_D$. Each register also has a read/write terminal connected to an input 51e of the encoder 50, a control terminal which is connected in each case to the connecting lead 66 (see also FIG. 3), and two terminals J and K. The J terminals of registers 54b, 54c, and 54d are connected to their respective D inputs while the K terminals of these registers are connected to the $\overline{Q}_D$ terminal of the register which precedes them. The J and K terminals of register 54a correspond to the $Q_D$ and $\overline{Q}_D$ outputs respectively of register 54e, the latter having its A and B inputs earthed or grounded and its C and D inputs connected to the outputs of respective ones of the two generators 56.

The electronic circuit 38 in FIG. 6 also includes, as in the case of FIG. 3, a transmission controlling circuit 64 having two outputs 62 and 66. This circuit consists of two JK flip-flops 104, 106, and three AND gates 108, 110, and 112, an OR gate 114, a sampling circuit 116, and a counter 118. The connections between these members are clearly shown in FIG. 6. In particular, it should be mentioned that gate 108 is an initializing gate, flip-flop 104 is connected to the validating button 44, sampling circuit 116 is connected to a sampling output of encoder 50, and gate 112 receives the signals from the clock 58 at one of its inputs. The modulator 60 of circuit 38 has two monostable flip-flops 120 and 122 whose Q outputs are applied to respective ones of two input terminals of an OR gate 124 whose output is connected to the input of an inverter 126. The inputs of the two flip-flops 120 and 122 are formed by respective AND gates.

The transducer 68 of the electronic circuit 38 is formed by a light-emitting diode 128 which has its anode connected to a source of voltage B+ and its cathode connected to the output of the inverter 126 by a biassing resistor 130. The diode 128 is coupled to the optical system 70.

The operation of the circuit of FIG. 6 will now be explained with reference to FIG. 7. The outputs from the keys 0 to 9 of the keyboard 42 are brought together at the encoder 50 which forms, in response to each of these keys, a signal consisting of four bits B0, B1, B2, B3, using the BCD code shown in the following table:

TABLE

| KEY | B3 | B2 | B1 | B0 |
|---|---|---|---|---|
| 0 | 0 | 0 | 0 | 0 |

TABLE-continued

| KEY | B3 | B2 | B1 | B0 |
|-----|----|----|----|----|
| 1 | 0 | 0 | 0 | 1 |
| 2 | 0 | 0 | 1 | 0 |
| 3 | 0 | 0 | 1 | — |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

The phase PC of loading the register 54 corresponds to the quiescent state of the electronic circuit 38, which corresponds to the zero state of flip-flop 106. This state validates the encoder 50 via lead 62, the encoder emitting the four bits B0 to B3 corresponding to the keys selected by the operator, together with a signal intended for the sampling circuit 116. The sampling circuit transmits a sampling pulse to AND gate 110, which receives at its other input a signal from the $\bar{Q}$ output of flip-flop 106. The output of AND gate 110 is fed to one input of OR gate 114 so that at each sampling pulse OR gate 114 passes a signal which controls the loading of register 54. This loading may be described with reference to FIG. 7. Waveform A represents the four actions of the operator in formulating his confidential code, which is assumed to be the number 9234. The four dips in waveform A represent these actions. Waveform B represents the four sampling pulses emitted by circuit 116 which correspond to each action of the operator on the keys of the keyboard 42. Waveforms C, D, E and F represent bits B0 to B3 respectively of the code, giving under the first pulse of waveform B the number 9 (1001), under the second pulse the number 2 (0100), under the third pulse the number 3 (1100), and under the fourth pulse the number 4 (0010).

In a known manner, the first number (9) is fed into the register 54a, the writing of the second number (2) transfers the first number to register 54b and feeds the second number into register 54a, the writing of the third number (3) shifts the first number into shift register 54c and the second number into register 54b and feeds the third number into register 54a, and finally the writing of the last number (4) results in the registers 54d, 54c, 54b and 54a containing the four bits corresponding to the numbers 9, 2, 3 and 4 respectively. In the modified embodiment of circuit in FIG. 6, the operator can check the correctness of the code number which he has formulated by pressing the display button 98, which causes the numbers contained in the respective registers to be displayed.

In addition, the parity generators produce a parity for each section of eight bits, the parity being loaded into register 54e. This concludes the loading phase PC.

If the operator finds the code is correct, he presses the validating button 44. This triggers the unloading of register 54 and the transmission of the code. This phase is marked PE in FIG. 7.

Pressing the validating button 44 sets the Q output of flip-flop 104 to 1, while flip-flop 106 is set to its 1 state by the decaying edge of the clock signal. In FIG. 7, the pulse in waveform G marks the pressing of button 44. Waveform H represents the state of the Q output of flip-flop 104 and shows that this state does in fact change in agreement with the pulse in waveform G. Waveform I represents the clock signal and waveform J represents the state of the Q output of flip-flop 106. This waveform shows the changeover by this output to the 1 state at the decaying edge of that clock pulse which follows the change of state of flip-flop 104 shown in waveform H. Line K shows the bits to be transmitted as they will appear in succession at the $Q_D$ output of register 54b, which is connected to modulator 60. Waveform L is that which appears at the output of OR gate 124 after modulation. Line M represents the state of counter 118 and finally waveform N represents the state of the output of the counter 118 which is connected to AND gate 108 and which, after counting the sixteen bits of the code and the two parity bits, emits a pulse which resets flip-flops 104 and 106 to zero, as indicated by waveforms H and J.

The kind of modulation employed in this embodiment is pulse-length modulation, which is well known in the art. The modulation is performed under the timing of clock 58. Briefly, the modulation is applied by means of two monostable flip-flops 120 and 122 which produce pulses whose lengths are respectively equal to $\frac{3}{4}$ and $\frac{1}{4}$ of the period of the clock frequency. Thus, referring to FIG. 6, when the $Q_D$ output of shift register 54d is in the 1 state, monostable flip-flop 120 will have three 1 bits at its input beginning from the positive going edge of the signal I from the clock 58. A 0 state at the $Q_D$ output of the shift register 54d on the other hand gives a 1 state at the $\bar{Q}_D$ output of this register, which is connected to monostable flip-flop 122. This produces the signal at the output of gate 124 represented by waveform L in FIG. 7. The pulse lengths could be different.

FIG. 8 shows an embodiment of electronic receiving circuit for an auxiliary member 16 according to the invention. This circuit corresponds to the block diagram shown in FIG. 4. The window 36 of member 32 is coupled to a phototransistor 132 which performs the function of the optoelectrical transducer 72 of FIG. 4. The phototransistor 132 has its emitter earthed and its collector connected to a source of voltage B+ via a resistor 134, and to a shaping circuit 136 which forms part of transducer 72, the output of which is applied to register 76. Register 76 is formed by five shift registers 76a to 76e, each of which have two input terminals J and K and five output terminals, $Q_A$, $Q_B$, $Q_C$, $Q_D$, and $\bar{Q}_D$. The J and K input terminals of registers 76b to 76e are connected to the $Q_D$ and $\bar{Q}_D$ outputs respectively of the preceding register. The J input of register 76a is connected to the output of transducer 72, while its K input is connected to the output of an inverter 138 whose input is connected to the output of transducer 72. The parity checkers 88 are coupled to the shift registers 76a and 76e in the manner shown in the drawing. The outputs of the two checkers 88 are applied to the respective ones of two inputs of an OR gate 140, the output of which is connected to the J input of an JK flip-flop 142. Flip-flop 142 forms a component of the error detector circuit 92 illustrated in FIG. 4.

The circuit of FIG. 8 also makes use of the generator 80 for generating addresses in the memory 82 of the chip 24 incorporated in member 16, the clock 86 belonging to the chip 24 or to the machine 12 of system 10, and the counter 78 which has eighteen count outputs successively referenced C1 to C18, outputs C1, C17 and C18 being the only ones shown in FIG. 8.

The remainder of the circuit, consisting of the logic comparison unit 84, the demodulator 74 and the circuits 92 and 96 of FIG. 4 is formed as follows. The output of transducer 72 is connected to the inputs of two monostable flip-flops 144 and 146. The $\bar{Q}$ output of monostable flip-flop 144 is connected to one input of an AND gate 145 whose output is connected to an input terminal of an OR gate 148 and to the input terminal of an AND gate 150, the second input terminal of the latter being formed by the count output C17 of counter 78. The output of AND gate 150 is connected to the validating terminal of JK flip-flop 142. The Q output of monostable flip-flop 146 is connected to an input of an OR gate 152, to the zero-reset terminal of a JK flip-flop 154 to an input of a NAND gate 156, and to the zero-reset terminal of JK flip-flop 142. Flip-flop 142 has its Q output connected to respective inputs of two AND gates 158, 160. Gate 158 has its other input connected to output C17 of counter 78. AND gate 160 has its output connected to the zero-reset terminal of JK flip-flop 162, which latter has its J input terminal connected to the Q output terminal of JK flip-flop 154 and its Q terminal connected to respective inputs of two AND gates 164 and 166 and to a second input terminal of OR gate 152. The output of AND gate 166 is connected to a second input of OR gate 148 and to input terminal of address generator 80. The signals from clock 86 are applied to a second input terminal of AND gate 166, to the clock terminal of flip-flop 162, to an input terminal of a NAND gate 168, and to second input terminals of gates 156 and 164. The third input of gate 156 is connected to the output terminal C1 of counter 78. Gate 168 has its second input terminal connected to the output terminal C17 of counter 78 and its output connected to a second input terminal of gate 160. The $\bar{Q}$ output of JK flip-flop 154 is connected to a second input terminal of AND gate 145 and to a first input terminal of an AND gate 170 which has its second input terminal connected to the output terminal C18 of counter 78. The latter has a driving terminal formed by the output of OR gate 152 and a clock terminal connected to the output of OR gate 148, as are all the clock terminals of registers 76a to 76e. An OR exclusive gate 94 is connected to the output of shift register 76e and to the output of memory 82. The output of this gate is connected to the J input of a JK of flip-flop 172 which has its Q and $\bar{Q}$ outputs connected to the J inputs of respective ones of two JK flip-flops 174 and 176. The zero reset terminals of flip-flops 172, 174 and 176 are connected to the output terminal of NAND gate 156, while the K inputs of these flip-flops are connected to a source of potential B+, via a resistor, as also are the control terminals of these flip-flops. The clock terminal of flip-flop 172 is connected to the output of AND gate 164, while the clock terminals of flip-flops 174 and 176 are connected to the output of AND gate 158. The Q outputs of flip-flops 174 and 176 form the OK, not OK outputs 96a and 96b shown in FIG. 4.

The operation of the circuit which has been described will now be explained with reference to FIG. 9. The light signals received by the phototransistor 132 are converted into an electrical signal which, if the transmission has been satisfactory, should correspond to that represented by waveform L in FIG. 7. This signal is represented in FIG. 9 by waveform A. This signal is fed to register 76 and monostable flip-flops 144 and 146. The demodulation of the signal is performed on the principle which may be deduced from the combination of waveforms A and B in FIG. 9, to reconstitute the bits in the manner indicated in line C of FIG. 9. Waveform B of FIG. 9 is that which exists at the $\bar{Q}$ output of monostable flip-flop 144, which reconstitutes the signals from the transmitting clock 58. In effect, the monostable flip-flop 144 triggers at each rising edge of the modulated signal represented by waveform A in FIG. 9 and returns to its rest position after a time corresponding to half the period of the pulses from clock 58. Thus, the items of data transmitted by transducer 72 are fed in series into the register formed by shift registers 76a to 76e, in synchronization with the rising edges of the output signal from output Q, thus reconstituting the bits of the code transmitted. Counter 78 counts the bits loaded into register 76 and when the eighteen bits have been loaded, reception is terminated. At this moment the parity checkers 88 transmit a signal in the 1 state to gate 140 if there has been a parity error. The error is recorded in flip-flop 142. The error signal will obviously be sampled at the last pulse, which corresponds to the eighteenth pulse in the case illustrated. If flip-flop 142 is set to the 1 state, the circuit of FIG. 8 is blocked and the message is ignored. As was stated with reference to FIG. 4, this state of flip-flop 142 may operate a circuit which is not shown to request the operator to reformulate the code.

In FIG. 9, waveforms D and E represent outputs C18 and C17 respectively of counter 78. Waveform F represents the Q output of monostable flip-flop 146. This flip-flop, which is triggered by the rising edge of the signal from transducer 72 has a period which, in the present embodiment, is calculated to be equal to 17T1+T2, where T1 is the period of the signals from the transmission clock 58 and T2 is the duration of the signal at the Q output of monostable flip-flop 144. The signal from flip-flop 146 validates counter 78 for the whole time during which it persists. The JK flip-flop 154 is set to 1 by the rising edge of the signal C18 from counter 78 and is reset to zero by the changeover of monostable flip-flop 146, which leaves a period of T1 for the reception of the declining edge of the signal from the clock 86 belonging to system 10, whose signals are illustrated by waveform G in FIG. 9. This declining edge sets JK flip-flop 162 to the 1 state, as represented by waveform H FIG. 9. This means that the clock 86 must have a minimum frequency f equal to the frequency of the clock 58. Flip-flop 162 having been set to 1, the pulses from clock 86 are validated and the bits in registers 76a to 76e are compared in comparator 94 with the bits from memory 82, the bits being actually compared at the declining edge of the signal from clock 86. The line I in FIG. 9 represents the state of the counter 78 and waveforms J and K represent the counts 16 and 17 of the counter. If the bits from memory 82 and register 76 are different, gate 94 emits a signal in the 1 state which sets flip-flop 172, and thus flip-flop 174, to 1, the latter transmitting from its output 96b the orders consequent upon an error being detected.

Flip-flop 172, 174 and 176 having been reset to zero upon the start of reception of the light pulses, if the confidential data received and the predetermined confidential data recorded in memory 82 correspond, flip-flop 172 sets the Q output of flip-flop 176 to the 1 state, this state being transmitted by connection 96a to a circuit for controlling the system which is designed to place the machine 12 at the disposal of the operator.

The invention is not, of course, in any way limited to the embodiments which have been described and illustrated and, in fact, covers all means which constitute technical equivalents of the means described, as well as combinations thereof if the combinations are made within the spirit of the invention and are employed in the scope of the following claims.

I claim:

1. A data processing system comprising a data processing machine having means for transmitting data, said data being of the type which includes confidential data, and at least a first member means auxiliary to the machine for receiving and processing at least the said confidential data, said transmitting means including a plurality of second auxiliary member means separate from the machine, each said second auxiliary member means being a light pen having means for formulating the confidential data and including means for transmitting the said confidential data to the said first member by means of a data-carrying light wave which is guided between the first and second auxiliary members in a guidance zone outside which it cannot be detected.

2. A system according to claim 1, wherein the data carrying wave is light radiation and the said guidance zone is defined by a screened optical-fibre system.

3. A system according to claim 1 or 2, wherein the aforesaid transmitting means includes a part attached to the machine to transmit data other than that dealt with by each of the said second members.

4. A system according to claim 2, where the aforesaid transmitting means comprises an encoder, a register operatively connected to receive an output from the encoder, a clock connected to the register, a modulator operatively coupled to the clock and to the register for modulating the output of the register under the timing of the clock, an opto-electrical transducer connected to receive the modulated output form the modulator, and said optical-fibre system being operatively coupled to the said transducer for transmitting the data carrying wave.

5. A system according to claim 1, wherein the aforesaid first member means comprises a memory member containing at least one item of predetermined data, an opto-electrical transducer adapted to receive the data carrying wave, a register operatively connected to receive the output of the transducer, a clock connected to the said register, a comparison circuit connected to the said register and to the said memory for comparing the outputs thereof, and a control circuit responsive to the output of said comparison circuit for authorizing communication with the said machine.

6. A system according to claim 1, 2 or 5 wherein the aforesaid first member means is one of a plurality of first auxiliary members, each of which is adapted to process a predetermined item of confidential data and to cooperate with one of the said second auxiliary member means.

7. A system according to claim 1, wherein said means for formulating the confidential data is a keyboard.

8. A system according to claim 19, wherein the keyboard includes cursors which are movable on the pen to formulate the confidential data in a predetermined code.

9. A system according to claim 1 or 8, wherein the keyboard includes a validating button adapted to be actuated for causing the formulated data to be transmitted.

10. A system according to claim 9, including means for resetting the cursors to a predetermined starting position.

11. A system according to claim 9, wherein said means for resetting is operatively connected to said validity button such that actuation of said validating button causes the cursors to be reset automatically to a neutral position to cancel out the formulated data.

12. A data processing system comprising a data processing machine having a terminal device for transmitting data, said data being of the type which includes confidential data formulated in a predetermined code, first means auxiliary to the machine for receiving and processing at least the said confidential data and authorizing a dialogue to take place between the machine, the terminal device and the first means, said terminal device including a plurality of second means separate from the machine, each of which is personal to a user of the machine and includes means to transmit at least the said confidential data to the said first means by means of a data-carrying light wave, and optical-fibre means for guiding said light wave between the first and second means, said optical-fibre means including screening means for defining a zone outside of which the transmitted data cannot be detected.

13. A system according to claim 12 wherein each of said second means comprises an encoder, a register operatively connected to receive an output from the encoder, a clock connected to the register, a modulator operatively coupled to the clock and the register for modulating the output of the register under the timing of the clock, an opto-electrical transducer connected to receive the modulated output from the modulator, and said optical-fibre means being coupled to said transducer.

14. A system according to claim 12 wherein the aforesaid first means comprises a memory member containing at least one item of predetermined data, an opto-electrical transducer adapted to receive the data carrying light wave, a register operatively connected to receive the output of the transducer, a clock connected to the said register, a comparison circuit connected to the said register and to the said memory, for comparing the outputs thereof, and a control circuit responsive to the output of said comparison circuit for authorizing the dialogue with the machine.

15. A system according to claim 14 wherein each of said second means is a light pen having a keyboard for formulating the confidential code.

16. A system according to claim 15 wherein the keyboard includes cursors which are movable longitudinally along the pen, said pen having a longitudinal graduated scale for establishing the coded data in accordance with the position of the cursors along the scale.

17. A system according to claim 16 wherein the keyboard includes a validating button adapted to be actuated for causing the formulated data to be transmitted.

18. A system according to claim 17 including means for resetting the cursors to a predetermined starting position and means operatively connected to the validating button to cause the cursors to be reset automatically to a neutral position to cancel out the formulated code.

* * * * *

UNITED STATES PATENT AND TRADEMARK OFFICE
CERTIFICATE OF CORRECTION

PATENT NO. : 4,224,666
DATED : September 23, 1980
INVENTOR(S) : Georges Jean Louis GIRAUD It is certified that error appears in the above-identified patent and that said Letters Patent are hereby corrected as shown below:

Claim 8, Column 13, line 52, the number "19" should be --7--.

Signed and Sealed this

Ninth Day of December 1980

[SEAL]

Attest:

SIDNEY A. DIAMOND

Attesting Officer

Commissioner of Patents and Trademarks